(No Model.)
C. HAMAKER.
TRIP HOOK FOR HAY ELEVATORS.
No. 411,860. Patented Oct. 1, 1889.
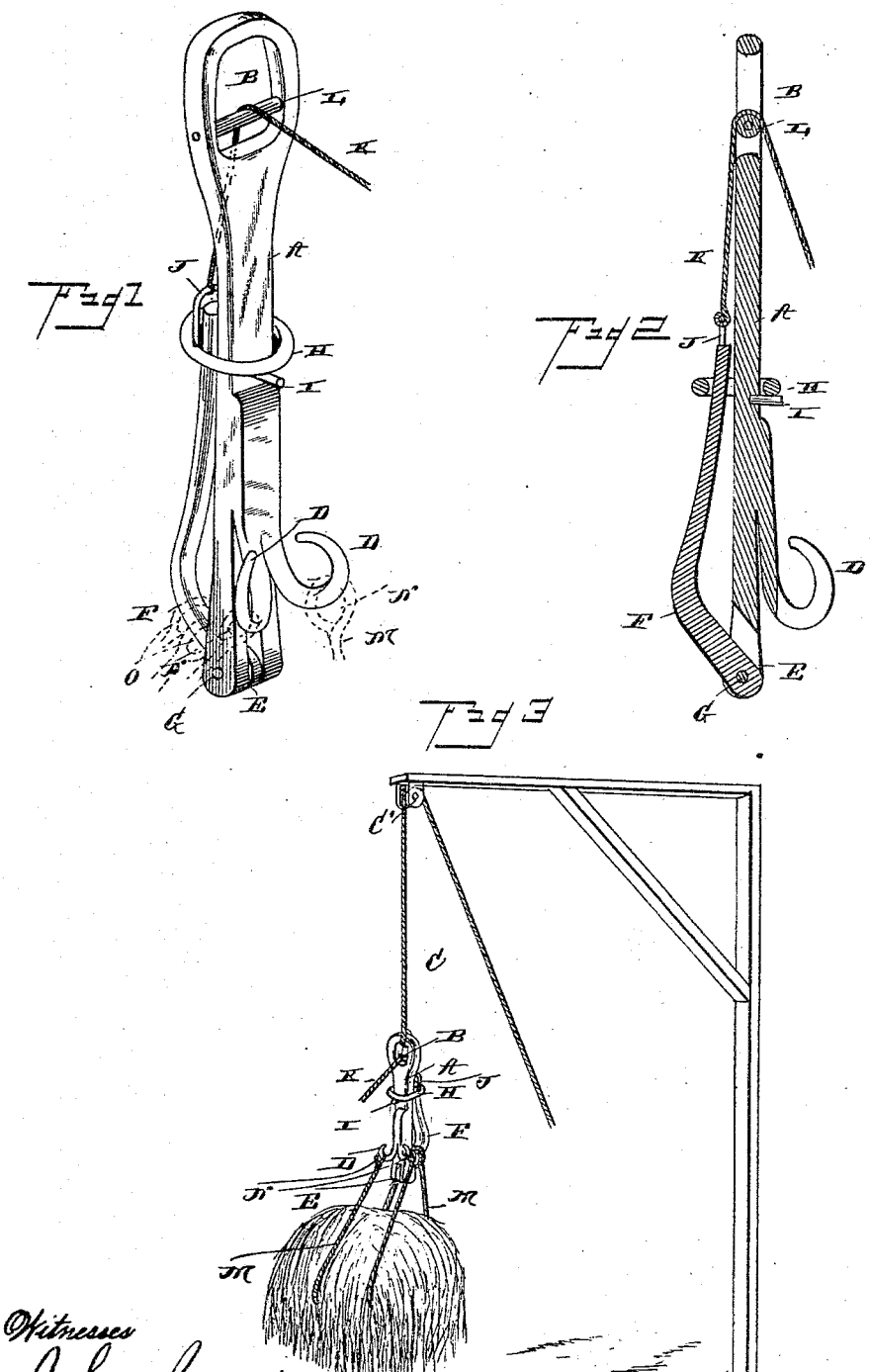

UNITED STATES PATENT OFFICE.

CLARK HAMAKER, OF BONANZA, OREGON.

TRIP-HOOK FOR HAY-ELEVATORS.

SPECIFICATION forming part of Letters Patent No. 411,860, dated October 1, 1889.

Application filed April 25, 1889. Serial No. 308,542. (No model.)

*To all whom it may concern:*

Be it known that I, CLARK HAMAKER, a citizen of the United States, residing at Bonanza, in the county of Klamath and State of Oregon, have invented a new and useful Trip-Hook for Hay-Elevators, of which the following is a specification.

This invention relates to trip-hooks for hay elevators and carriers; and it has for its object to provide a device of this class which shall be exceedingly simple in construction, strong, and durable, and by the use of which ordinary ropes may be employed to support the load of hay in lieu of the more complicated slings which are customarily used.

The invention consists in the improved construction and arrangement of parts, which will be hereinafter described, and particularly pointed out in the claims.

In the drawings, Figure 1 is a perspective view of my improved trip-hook. Fig. 2 is a vertical sectional view of the same. Fig. 3 is a perspective view illustrating the operation of the device.

The same letters refer to the same parts in all the figures.

My improved trip-hook comprises a shank or body A, the upper end of which is formed with an eye B, to which the elevating-rope C may be attached. One side of the shank A is provided near its lower end with a pair of stout hooks D D, diverging in opposite directions obliquely from the said shank or body A. The said hooks D may be secured to the shank A in any suitable manner; but they are preferably formed integrally therewith. The shank A is provided at its lower end with a transverse notch E, in which the hook or trip F is pivotally mounted upon a pin G. The upper end of the hook or trip F is adapted to bear against the body of the shank A.

H designates a link mounted upon the shank or body A between the hooks D D and the eye B.

I designates a pin extending laterally from the shank A a short distance above the hooks D D, to prevent the link H from sliding downward too far. Suitably attached to the front side of the upper end of the link H is a bail or staple J, to which is attached a trip-cord K, which passes from thence over a roller or sheave L, journaled transversely in the lower end of the eye B, and from thence downwardly to a point within reach of the operator.

M M designate the ropes, which are provided at their ends with loops N O, by the former of which they are to be suspended upon the hooks D D, while the latter are to be adjusted upon the trip-hook F.

The operation of the invention will be readily understood from the foregoing description, taken in connection with the drawings hereto annexed.

My improved trip-hook or carrier is suspended from the tackle C', which may be arranged in any desired manner to elevate the load and carry it to a suitable place of deposit. The ropes M M may be placed in the bottom of a wagon and the hay loaded on top thereof. When the load reaches the carrier, the loops N N at one end of the ropes are adjusted upon the hooks D D and the loops O O upon the trip F, the upper end of which is then secured in a raised position by means of the link H, which slides down over the said trip-hook to an extent limited by the laterally-extending pin I. The load is now elevated and carried to the place of deposit, when, by pulling the trip-rope, the link H may be drawn in an upward direction, so as to release the trip F, which at once swings downwardly, so as to release the loops O at the ends of the ropes M, thus dumping the load.

Having thus described my invention, I claim—

1. The combination of a shank or body, hooks diverging outwardly from the rear side of the same, a trip-hook connected pivotally to its lower end and adapted to fold upwardly against the front side of said shank, a link sliding vertically upon said shank and adapted to engage the trip-hook, and a trip-cord for raising said link, substantially as set forth.

2. The combination of the shank having rearwardly-extending diverging hooks and provided with an eye at its upper end, a trip-hook pivoted at the lower end of said shank, a link sliding vertically upon the latter and having an upwardly-extending bail or staple, a pin extending laterally from the shank to limit the movement of said link, a sheave journaled in the eye at the upper end of the shank, and a trip-cord passing over said sheave and attached to the upwardly-extending bail of the sliding link, substantially as herein set forth.

In testimony that I claim the foregoing as my own I have hereto affixed my signature in presence of two witnesses.

CLARK HAMAKER.

Witnesses:
SILAS N. KILGORE,
J. O. HAMAKER.